US009927897B2

(12) United States Patent
Ko et al.

(10) Patent No.: US 9,927,897 B2
(45) Date of Patent: Mar. 27, 2018

(54) DISPLAY DEVICE INCLUDING PATTERN CONDUCTING LINES

(71) Applicant: Samsung Display Co., Ltd., Yongin-si (KR)

(72) Inventors: Gwang-bum Ko, Seongnam-si (KR); Hyunjae Na, Seoul (KR); Hyoungwook Jang, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 65 days.

(21) Appl. No.: 15/042,505

(22) Filed: Feb. 12, 2016

(65) Prior Publication Data

US 2016/0306476 A1    Oct. 20, 2016

(30) Foreign Application Priority Data

Apr. 16, 2015 (KR) .......................... 10-2015-0053980

(51) Int. Cl.
| | | |
|---|---|---|
| *G06F 3/041* | (2006.01) | |
| *G09G 3/3225* | (2016.01) | |
| *G06F 1/16* | (2006.01) | |
| *G06F 3/044* | (2006.01) | |
| *G09G 3/3233* | (2016.01) |

(52) U.S. Cl.
CPC .......... *G06F 3/0412* (2013.01); *G06F 1/1618* (2013.01); *G06F 3/044* (2013.01); *G06F 3/0416* (2013.01); *G09G 3/3225* (2013.01); *G06F 2203/04102* (2013.01); *G09G 3/3233* (2013.01); *G09G 2300/0842* (2013.01)

(58) Field of Classification Search
CPC .................................................. G06F 3/0412

USPC .......................................................... 345/173
See application file for complete search history.

(56) References Cited

U.S. PATENT DOCUMENTS

| | | | | |
|---|---|---|---|---|
| 5,831,708 A | * | 11/1998 | Hiraishi ................ | G02F 1/1333 349/143 |
| 8,599,161 B2 | | 12/2013 | Philipp | |
| 2013/0285980 A1 | * | 10/2013 | Oya ......................... | G06F 3/044 345/174 |
| 2014/0168161 A1 | * | 6/2014 | Sugita ..................... | G06F 3/044 345/174 |
| 2015/0022515 A1 | * | 1/2015 | Ikeda .................... | G09G 3/3275 345/212 |
| 2016/0188098 A1 | * | 6/2016 | Her ....................... | G06F 3/0416 345/173 |

FOREIGN PATENT DOCUMENTS

| | | |
|---|---|---|
| KR | 10-2011-0127236 | 11/2011 |
| KR | 10-2014-0099139 | 8/2014 |
| KR | 10-2014-0099164 | 8/2014 |

* cited by examiner

*Primary Examiner* — Long D Pham
(74) *Attorney, Agent, or Firm* — H.C. Park & Associates, PLC

(57) ABSTRACT

A display device includes a substrate, gate lines disposed on the substrate and extending in a first direction, data lines insulated from the gate lines and extending in a second direction crossing the first direction, pixels electrically connected to the gate lines and the data lines, wherein at least one line of the gate lines and the data lines comprises a ring pattern, wherein the ring pattern comprises rings and adjacent rings are electrically connected to each other in at least one position.

19 Claims, 15 Drawing Sheets

DISPLAY DEVICE INCLUDING PATTERN CONDUCTING LINES

CROSS REFERENCE TO RELATED APPLICATION

This application claims priority from and the benefit of Korean Patent Application No. 10-2015-0053980, filed on Apr. 16, 2015, which is hereby incorporated by reference for all purposes as if fully set forth herein.

BACKGROUND

Field

Exemplary embodiments relate to a display device. More particularly, exemplary embodiments relate to a display device including a display panel and a touch panel, each having a ring pattern line.

Discussion of the Background

Various electronics employ display devices, including television sets, mobile phones, tablet computers, navigation systems, game devices, etc. Typically, a keyboard or a mouse is used as an input device of the display devices. However, recently, display devices have included a touch panel as their input device. The touch panel may obtain information about a position at which a touch event occurs. Thus, the touch panel may be used as the input device for the display devices instead of the keyboard or the mouse.

Unlike the typical flat panel display device, various flexible display devices, such as a curved display device, a bent display device, a foldable display device, a rollable display device, a stretchable display device, etc., have recently been developed.

However, various signal lines included in the flexible display device may be disconnected when the flexible display device is folded along a folding axis.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a display panel and a touch panel, each including lines disposed in a ring pattern.

Additional aspects will be set forth in the detailed description which follows, and, in part, will be apparent from the disclosure, or may be learned by practice of the inventive concept.

Exemplary embodiments disclose a display device including a substrate, a plurality of gate lines disposed on the substrate and extending in a first direction, a plurality of data lines insulated from the gate lines and extending in a second direction crossing the first direction, and a plurality of pixels connected to the gate lines and the data lines. At least one line of the gate lines and the data lines includes a plurality of ring patterns arranged in a direction in which the one line extends, and two ring patterns adjacent to each other among the ring patterns may be connected to each other at least one position.

Exemplary embodiments also disclose, a display device including a folding area and an nonfolding area. The display device includes a display panel including a first signal line disposed in the folding area and a touch panel including a second signal line disposed in the folding area. At least one signal line of the first and second signal lines includes a plurality of ring patterns arranged in a direction in which the one signal line extends, and two ring patterns adjacent to each other among the ring patterns may be connected to each other at least one position.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
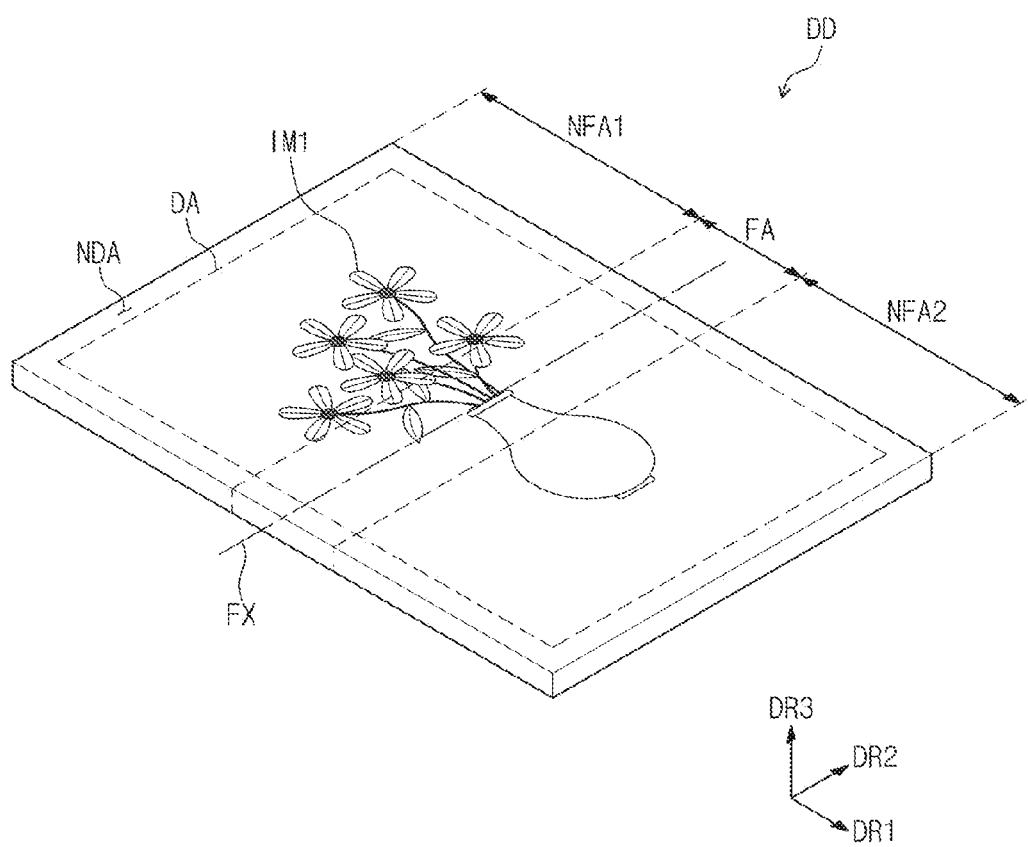
FIGS. 1A and 1B are perspective views showing a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the present invention will be explained in detail with reference to the accompanying drawings.

Figure 1B:
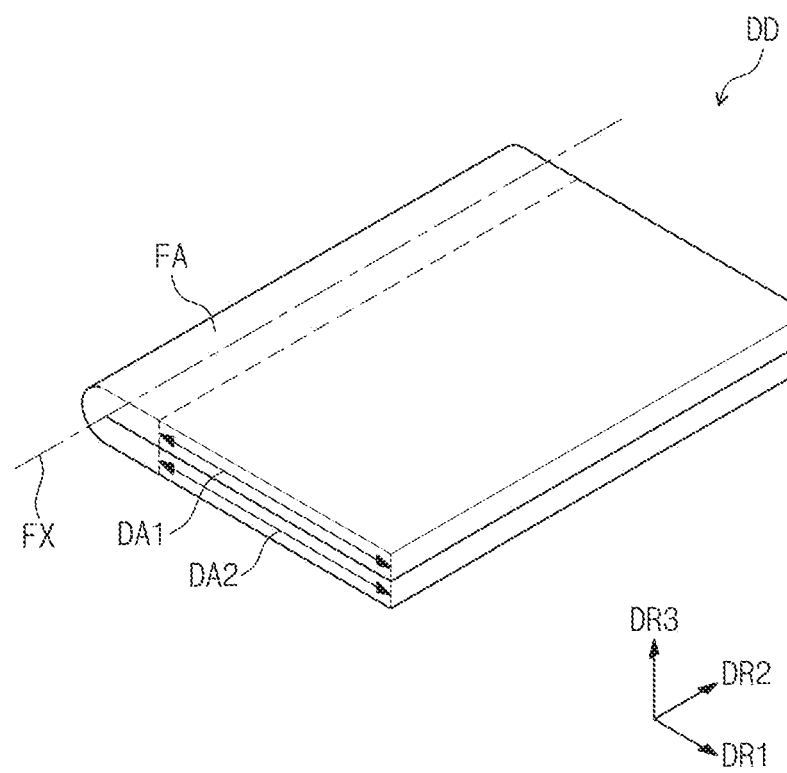

FIGS. 1A and 1B are perspective views showing a display device DD according to an exemplary embodiment. According to the exemplary embodiment, a foldable display device will be described as the display device DD, but the display device DD should not be limited to the foldable display device. That is, various display devices, such as a curved display device, a bent display device, a rollable display device, a stretchable display device, etc., may be used as the display device DD. Although not shown in figures, the display device DD may be applied to a large-sized electronic item, such as a television set, an outdoor billboard, etc., and a small and medium-sized electronic item, such as a personal computer, a notebook computer, a personal digital assistants, a navigation unit, a game unit, a mobile electronic device, a wrist-type electronic device, a camera, etc.

Referring to FIGS. 1A and 1B, a display surface on which an image IM1 is displayed may be substantially parallel to a surface defined by a first direction DR1 and a second direction DR2. A normal line direction relative to the display surface constitutes a third direction DR3. The third direction DR3 indicates a thickness direction of the display device DD. A front surface and a rear surface of each member may be distinct from each other according to the third direction DR3, however directions indicated by the first, second, and third directions DR1, DR2, and DR3 may be relative to each other.

As shown in FIGS. 1A and 1B, the display device DD includes a plurality of areas that may be as defined on the display surface and may be distinct from each other. The display device DD includes a display may be a DA and a non-display may be a NDA according to whether the image IM1 may be displayed or not. That is, an area in which the image IM1 may be displayed in the display may define display area DA and an area in which the image IM1 may not be displayed may define non-display area NDA. The non-display area may be a non-display area NDA may be disposed adjacent to the display may be a display area DA. FIG. 1A shows a vase image as the image IM. As an example, the display area DA may have substantially a quadrangular shape, but is not limited thereto. The non-display area NDA may surround the display area DA. The display device DD includes a folding area FA folded along a folding axis FX, a first nonfolded area NFA1, and a second nonfolded area NFA2.

Figure 2A:
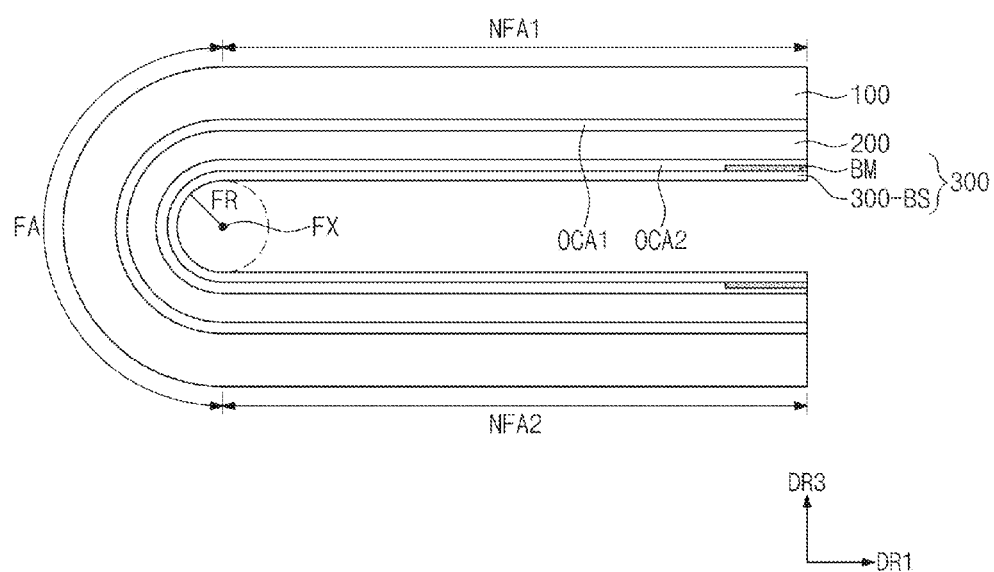
FIGS. 2A and 2B are enlarged cross-sectional views showing a display device according to an exemplary embodiment.
Figure 2B:
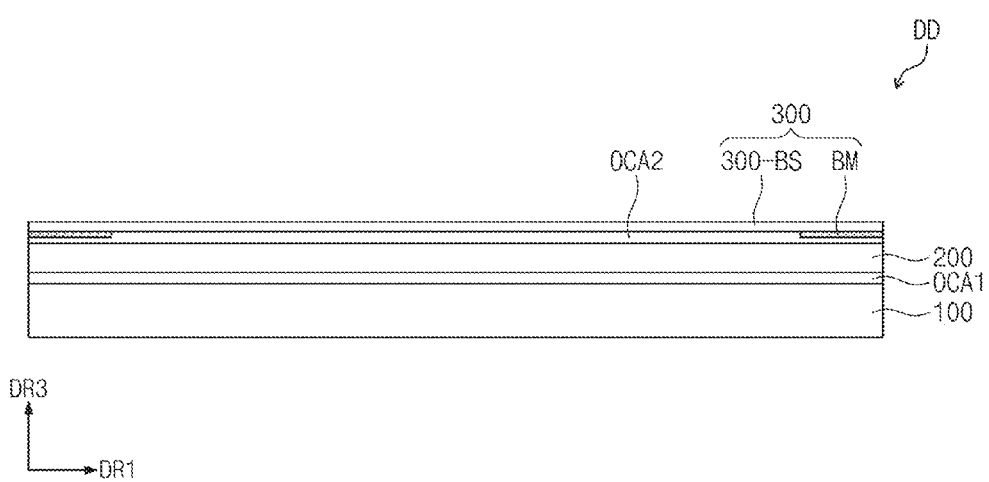

FIGS. 2A and 2B are enlarged cross-sectional views showing the display device DD according to an exemplary embodiment.

Referring to FIG. 2A, the display device DD may be folded along the folding axis FX such that the display surface corresponding to the first nonfolded area NFA1 faces the display surface corresponding to the second nonfolded area NFA2. Hereinafter, the folded state allowing the display surfaces of different areas to face each other may be referred to as an inner folding.

Since the first nonfolded area NFA1 may be rotated in a clockwise direction with respect to the folding axis FX, the display device DD may be folded towards the inside. Although not shown in figures, the display device DD may be folded with respect to the folding axis FX to allow the display surfaces of the first and second nonfolding areas NFA1 and NFA2 to be folded toward the outside of the display device DD. Hereinafter, the folded state allowing the display surfaces of different areas to face the outside may be referred to as an outer folding.

Referring to FIGS. 2A and 2B, the display device DD includes a display panel 100, a touch panel 200, and a window member 300. Although not shown in figures, the display device DD further may include a protective member coupled to the window member 300 to protect the display panel 100 and the touch panel 200. Each of the display panel 100, the touch panel 200, and the window member 300 may have flexibility.

The display panel 100 generates the image IM1 (referring back to FIG. 1A) corresponding to image data input thereto. The display panel 100 may be, but is not limited to, a liquid crystal display panel, an organic light emitting display panel, an electrophoretic display panel, or an electrowetting display panel. Hereinafter, the organic light emitting display panel will be described as the display panel 100.

The touch panel 200 may be used to obtain coordinate information of an input position. The touch panel 200 may be disposed on a front surface of the display panel 100, but the position of the touch panel 200 should not be limited thereto or thereby. The touch panel 200 may be, but not limited to, a touch sensitive type or a non-touch sensitive type.

The window member 300 includes a base member 300-BS and a black matrix BM. The black matrix BM may be disposed on a rear surface of the base member 300-BS to define a bezel may be, for example, the non-display area NDA (refer to FIG. 1A). The base member 300-BS may be, but not limited to, a glass substrate, a sapphire substrate, or a plastic film. The black matrix BM may be a colored organic layer and may be formed by a coating method. Although not shown in figures, the window member 300 may further include a coating layer disposed on the front surface of the base member 300-BS, e.g., an anti-fingerprint layer, an anti-reflection layer, a hard coating layer, etc.

The display panel 100 and the touch panel 200 may be coupled to each other using an optically clear adhesive film OCA1. The touch panel 200 and the window member 300 may be coupled to each other using an optically clear adhesive film OCA2.

The touch panel 200 may be realized as an add-on structure in which the touch panel 200 may be coupled to the display panel 100 by the optically clear adhesive film OCA1, but it should not be limited there to or thereby. That is, the touch panel 200 may be realized as an on-cell structure, in which the touch panel 200 may be directly patterned on the display panel 100. In this case, the optically clear adhesive film OCA1 may be omitted.

The touch panel 200 and the window member 300 may be coupled to each other using the optically clear adhesive film OCA2.

The display panel 100 includes at least one first signal line disposed in the folding area FA or the nonfolded area NFA. The first signal line may be a plurality of gate lines or a plurality of data lines, which may be disposed on the display panel 100, but the first signal line should not be limited to the gate lines and the data lines. That is, the first signal line may be one of signal lines disposed in the folding area FA or in the nonfolded area NFA. Hereinafter, the gate lines and the data lines disposed on the display panel 100 will be described as the first signal line.

The touch panel 200 includes at least one second signal line disposed in the folding area FA or the nonfolded area NFA. For instance, the second signal line may be one of a plurality of conductive lines and a plurality of signal connection lines connected to the conductive lines, which may be disposed on the touch panel, however the second signal line should not be limited to the conductive lines and the signal connection lines. That is, the second signal line may be one of signal lines disposed in the folding area FA or the nonfolded area NFA of the touch panel. The conductive lines and the signal connection lines disposed on the touch panel 200 will hereinafter be described as the second signal line.

Figure 3:
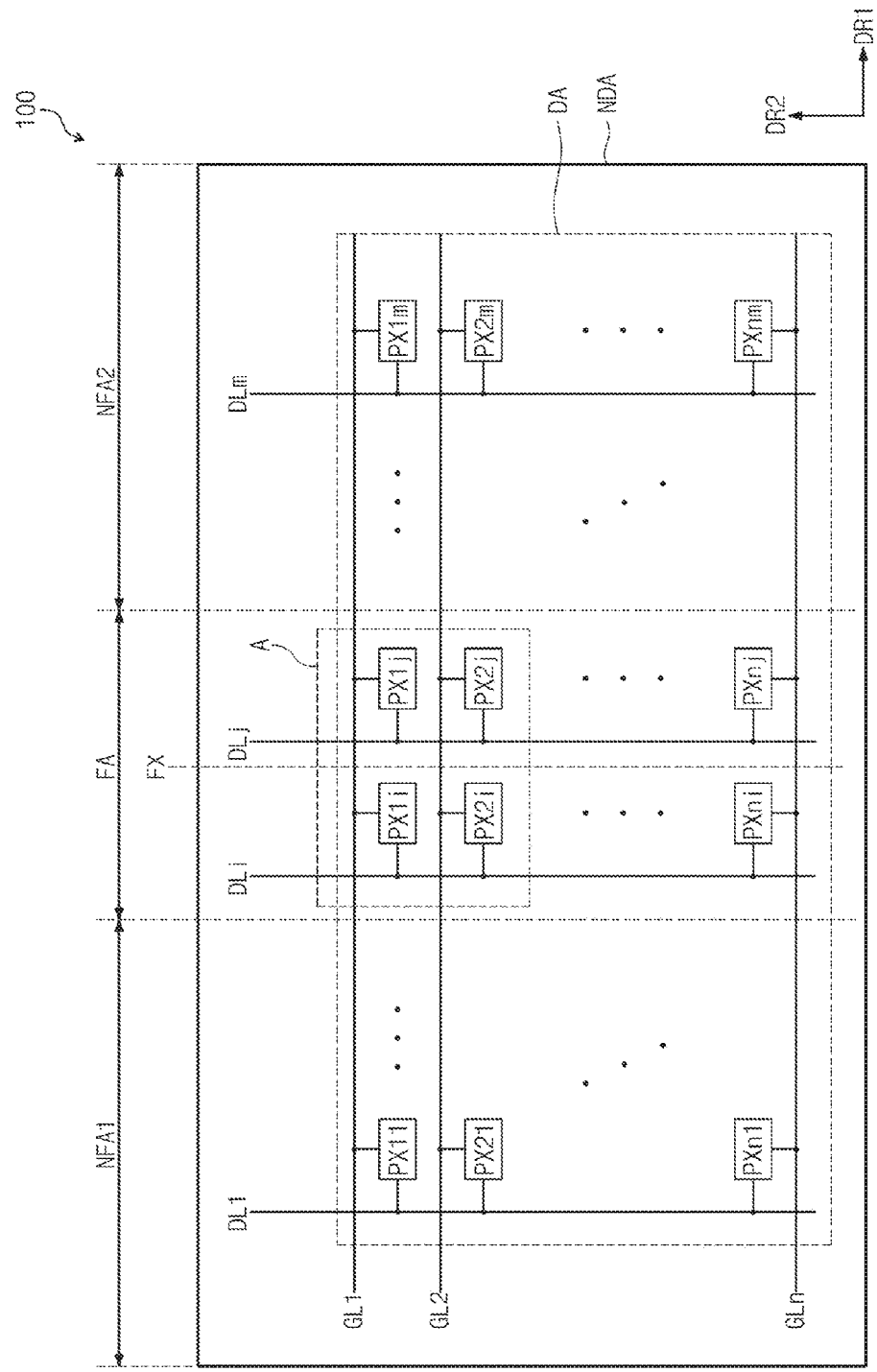
FIG. 3 is a plan view showing a display panel according to an exemplary embodiment.
Figure 4:
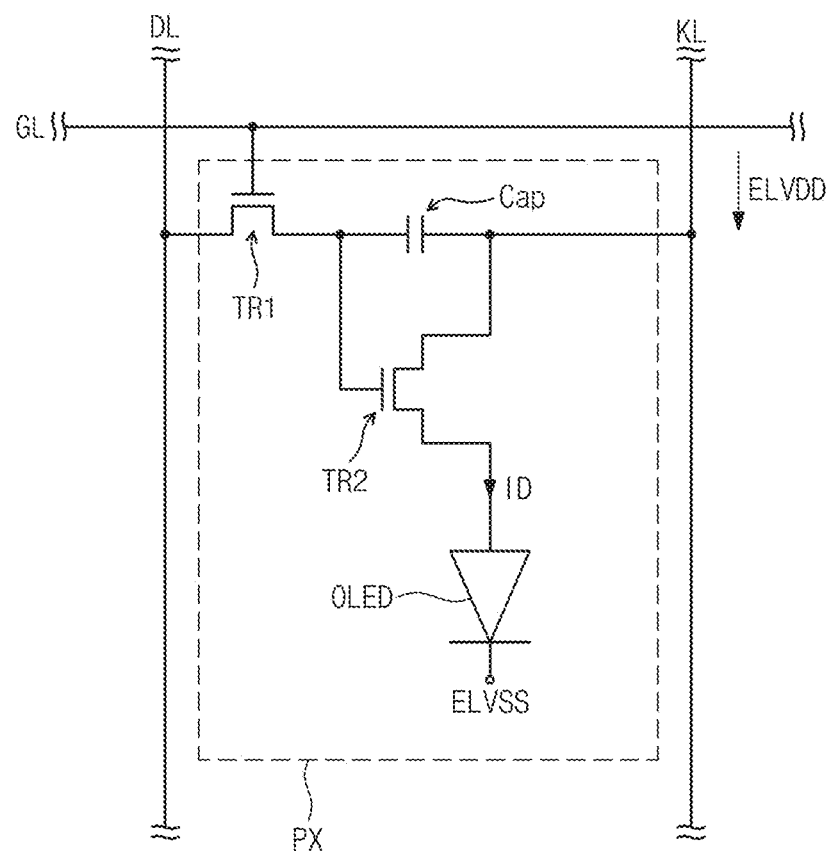
FIG. 4 is a circuit diagram showing one pixel of pixels shown in FIG. 3.

FIG. 3 is a plan view showing a display panel according to an exemplary embodiment of the present disclosure and FIG. 4 is a circuit diagram showing one pixel of pixels shown in FIG. 3.

Referring to FIG. 3, the display panel 100 includes a plurality of gate lines GL1 to GLn, a plurality of data lines DL1 to DLm, and a plurality of pixels PX11 to PXnm. The gate lines GL1 to GLn may be insulated from the data lines DL1 to DLm while crossing the data lines DL1 to DLm. Although not shown in figures, each of the gate lines GL1 to GLn may receive a corresponding gate signal from a gate driver (not shown). Each of the data lines DL1 to DLm receives a corresponding data voltage from a data driver (not shown).

The pixels PX11 to PXnm may be arranged in a matrix form defined in association with the gate lines GL1 to GLn and the data lines DL1 to DLm. Accordingly, the pixels PX11 to PXnm may be arranged in a matrix form of n rows by m columns. Each of "n" and "m" may be an integer number greater than 0.

Each of the pixels PX11 to PXnm may be connected to a corresponding gate line of the gate lines GL1 to GLn and a corresponding data line of the data lines DL1 to DLm. The pixels PX11 to PXnm receive the data voltages through the data lines DL1 to DLm in response to the gate signals provided through the gate lines GL1 to GLn. As a result, the pixels PX11 to PXnm display grayscales corresponding to the data voltages.

Although not shown in figures, the display panel 100 may further include a plurality of voltage lines (not shown). The voltage lines may be connected to the pixels PX11 to PXnm, respectively.

Since the pixels PX11 to PXnm have the same structure, FIG. 4 shows only one pixel PX among the pixels PX11 as a representative example.

Referring to FIG. 4, the pixel PX includes a first thin film transistor TR1, a second thin film transistor TR2, at least one capacitor Cap, and an organic light emitting diode OLED. The pixel PX receives the gate signal through the corresponding gate line GL and the data voltage through the corresponding data line DL.

The first thin film transistor TR1 outputs the data voltage provided through the data line DL in response to the gate signal provided through the gate line GL. The capacitor Cap may be charged with a voltage corresponding to the data signal provided from the first thin film transistor TR1.

The second thin film transistor TR2 may be connected to the organic light emitting diode OLED. The second thin film transistor TR2 controls a driving current ID flowing through the organic light emitting diode OLED in response to an amount of electric charge charged in the capacitor Cap.

The organic light emitting diode OLED may be connected to the second thin film transistor TR2 and may include a first electrode (not shown) applied with a first source voltage ELVDD provided from a power line KL and a second electrode (not shown) applied with a second source voltage ELVSS.

The organic light emitting diode OLED may include an organic light emitting layer disposed between the first electrode and the second electrode. The organic light emitting diode OLED may emit a light the light during a turn-on period of the second thin film transistor TR2.

As described with reference to FIGS. 1A, 1B, 2A, and 2B, the display device DD may be a flexible display device. That is the display device DD may be folded along the folding axis FX. In this case, the gate lines GL1 to GLn and the data lines DL1 to DLm may be folded along the folding axis FX since the display panel 100 may be folded along the folding axis FX.

In a conventional display device, the data lines DL1 to DLm and the pixels PX11 to PXnm have a straight line shape. In detail, the gate lines GL1 to GLn may be disposed in a straight line pattern crossing the folding area FA along a direction substantially perpendicular to the folding axis FX. In this case, when the display panel 100 is folded with respect to the folding axis FX, the gate lines GL1 to GLn having the straight line shape may also be folded along the folding axis FX. As a result, a portion of the gate lines GL1 to GLn may be disconnected.

However, according to exemplary embodiments of the present disclosure, at least one of the gate lines GL1 to GLn and the data lines DL1 to DLm may have a plurality of ring patterns arranged in the first direction DR1 or the second direction DR2. Among the ring patterns, two ring patterns adjacent to each other may be connected to each other at least one position.

Although not shown in figures, at least one voltage line of the voltage lines connected to the pixels PX11 to PXnm may have the ring patterns.

As described above, when the gate lines GL1 to GLn may be arranged to have the ring pattern, an area in which the gate lines GL1 to GLn are disposed perpendicular to the folding axis FX may be reduced compared to that when the gate lines GL1 to GLn may be arranged to have the straight line pattern. As a result, although the display device D may be folded with respect to the folding axis FX, the lines arranged on the display panel 100 may be prevented from being disconnected. This will be described in detail with reference to FIGS. 5 to 9.

Figure 5:
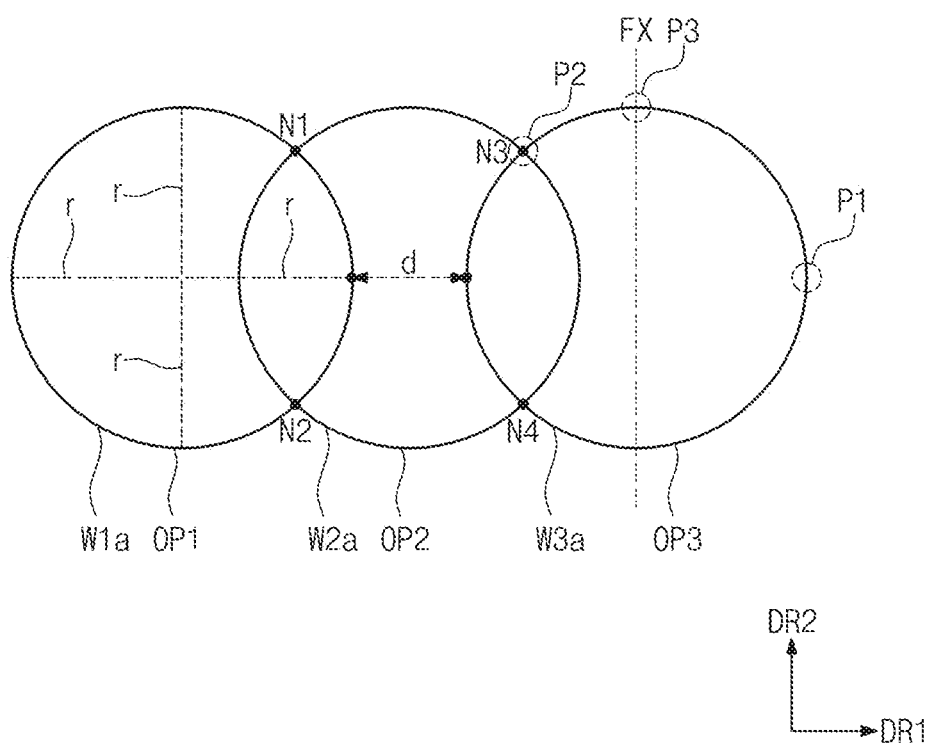
FIG. 5 is a view showing a structure of signal lines, each having a ring shape, according to an exemplary embodiment.
Figure 6:
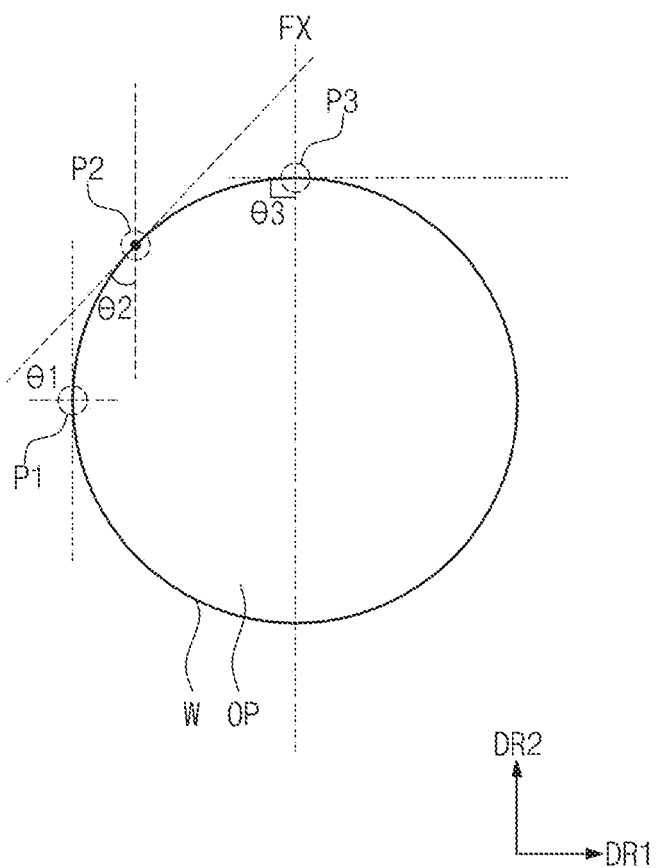
FIG. 6 is a view showing angles between a folding axis and each of first, second, and third positions shown in FIG. 5.

FIG. 5 is a view showing a structure of signal lines, each having a ring pattern shape, according to an exemplary embodiment of the present disclosure and FIG. 6 is a view showing angles between a folding axis and each of first, second, and third positions shown in FIG. 5.

Hereinafter, one gate line of the gate lines GL1 to GLn will be described with reference to FIGS. 4 to 6. Each of the gate lines GL1 to GLn and each of the data lines DL1 to DLm have the same pattern as that shown in FIG. 5.

The gate line shown in FIG. 5 includes first, second, and third ring patterns W1a, W2a, and W3a consecutively arranged in the first direction DR1. That is, the gate line may be disposed on the display panel 100 in the shape of the first to third ring patterns W1a to W3a.

According to the exemplary embodiment shown in FIG. 5, each of the first to third ring patterns W1a to W3a may have substantially a circular shape and may have a hollow (i.e. ring) shape. A first opening OP1 may be defined inside the first ring pattern W1a, a second opening OP2 may be defined inside the second ring pattern W2a, and a third opening OP2 may be defined inside the third ring pattern W3a. The first to third ring patterns W1a to W3a have substantially the same radius r.

The first ring pattern W1a may be electrically connected to the second ring pattern W2a at two positions, e.g., first and second nodes N1 and N2. The second ring pattern W2a may be electrically connected to the third ring pattern W3a at two positions, e.g., third and fourth nodes N3 and N4. In this case, the first ring pattern W1a and the third ring pattern W3a may be spaced apart from each other by a set distance d. However, the ring pattern arrangements are not limited thereto.

For example, the first ring pattern W1a may be electrically connected to the third ring pattern W3a at one position. In this case, no distance d exists between the first and third ring patterns W1a and W3a.

In the exemplary embodiment shown in FIG. 5, each of the first to third ring patterns W1a to W3a may have the circular shape, but the shape of the first to third ring patterns W1a to W3a should not be limited to a strictly circular shape. That is, the first to third ring patterns W1a to W3a may have different curved shapes from each other. For instance, the first and third ring patterns W1a and W3a may have the same circular shape, but the second ring pattern W2a may have an oval shape different from the circular shape of the first and third ring patterns W1a and W3a.

As shown in FIGS. 5 and 6, the first to third ring patterns W1a to W3a may be folded at various angles with respect to the folding axis FX. The ring pattern W shown in FIG. 6 corresponds to one of the first to third ring patterns W1a to W3a folded along the folding axis FX. First, second, and third positions OP1, OP2, and OP3 of the ring pattern W shown in FIG. 6 correspond to the folding area FA.

In detail, when the ring pattern W is folded along the folding axis FX, a tangent line of the first position P1 of the ring pattern W may have a first angle θ1 with respect to the folding axis FX. The first angle θ1 may be substantially parallel to the folding axis FX.

When the ring pattern W is folded along the folding axis FX, a tangent line of the second position P2 of the ring pattern W may have a second angle θ2 with respect to the folding axis FX. The second angle θ2 may be greater than the first angle θ1.

When the ring pattern W is folded along the folding axis FX, a tangent line of the third position P3 of the ring pattern W may have a third angle θ3 with respect to the folding axis FX. The third angle θ3 may be greater than the second angle θ2 and may have a perpendicular value (i.e. approximately 90 degrees with respect to folding axis FX).

As the lines may be arranged in an approximate perpendicular direction to the folding axis, the lines may be easily disconnected. Therefore, a possibility of disconnection of the ring pattern W may be lowest at the first position P1 substantially parallel to the folding axis FX and the possibility of disconnection of the ring pattern W may be highest at the third position P3 substantially vertical to the folding axis FX.

In the exemplary embodiment shown in FIGS. 5 and 6, the gate lines GL1 to GLn and the data lines DL1 to DLm may be formed in a ring pattern, and thus the disconnection of gate lines GL1 to GLn and the data lines DL1 to DLm, which may still be disposed perpendicular to the folding axis FX, may be reduced compared to that when the gate lines GL1 to GLn and the data lines DL1 to DLm may be formed to have the straight line shape.

As described above, the first to third ring patterns W1a to W3a may be electrically connected to each other through the first to fourth nodes N1 to N4. As a result, although the disconnection may occur at a portion of the first to third ring patterns W1a to W3a, the gate signal may be continuously transmitted along the first direction DR1 through at least one node of the first to fourth nodes N1 to N4.

Figure 7:
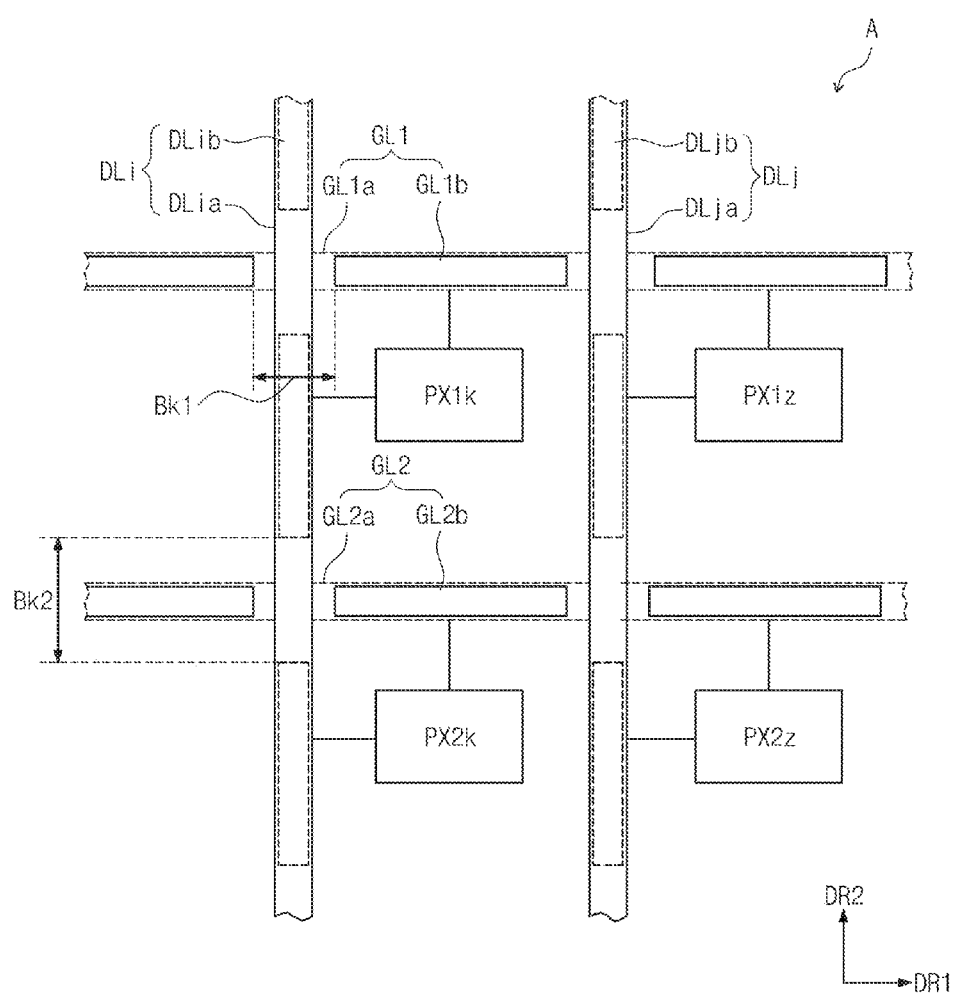
FIG. 7 is an enlarged plan view showing a portion "A" shown in FIG. 3.

FIG. 7 is an enlarged plan view showing a portion "A" shown in FIG. 3.

FIG. 7 shows first and second gate lines GL1 and GL2 and k-th and z-th data lines DLk and DLz. The portion A shown in FIG. 7 may be included in the folding area FA.

Each of the gate lines GL1 to GLn includes a main gate line and a sub-gate line. For instance, the first gate line GL1 shown in FIG. 7 includes a first main gate line GL1a and a first sub-gate line GL1b and the second gate line GL2 shown in FIG. 7 includes a second main gate line GL2a and a second sub-gate line GL2b. The first and second main gate lines GL1a and GL2a may be shown to be greater than the first and second sub-gate lines GL1b and GL2b in FIG. 7, but the size of the first and second main gate lines GL1a and GL2a may be substantially the same as that of the first and second sub-gate lines GL1b and GL2b.

The main gate line and the sub-gate line of each of the gate lines GL1 to GLn may be insulated from each other and disposed on different layers from each other. The sub-gate lines of the gate lines GL1 to GLn may be arranged along the first direction DR1 and include a plurality of segments that may be spaced apart from each other by a first distance Bk1. Although not shown in figures, the main gate line and the sub-gate line may be electrically connected to each other through a contact hole. This will be described in detail with reference to FIG. 8.

Each of the data lines DL1 to DLm includes a main data line and a sub-data line. For instance, the k-th data line DLk shown in FIG. 7 includes a k-th main data line DLka and a k-th sub-data line DLkb and the z-th data line DLz shown in FIG. 7 includes a z-th data line DLz shown in FIG. 7 includes a z-th main data line DLza and a z-th sub-data line DLzb. The k-th and z-th main data lines DLka and DLza may be shown to be greater than the k-th and z-th sub-data lines DLkb and DLzb in FIG. 7, but the size of the k-th and z-th main data lines DLka and DLza may be substantially the same as that of the k-th and z-th sub-data lines DLkb and DLzb.

In particular, the main data line and the sub-data line of each of the data lines DL1 to DLm may be insulated from each other and disposed on different layers from each other. The sub-data lines of the data lines DL1 to DLm may be arranged along the second direction DR2 and may include a plurality of segments spaced apart from each other by a second distance Bk2 at every predetermined interval. Although not shown in figures, the main data line and the sub-data line may be electrically connected to each other through a contact hole.

In the present exemplary embodiment, the main gate lines of the gate lines GL1 to GLn may be insulated from the sub-data lines of the data lines DL1 to DLm while crossing the sub-data lines. The main gate lines of the gate lines GL1 to GLn may be disposed on the same layer as the sub-data lines of the data lines DL1 to DLm.

That is, one main gate line among the main gate lines may be disposed to cross one sub-data line among the sub-data lines spaced apart from each other by the second distance Bk2 at every predetermined interval. In this case, the corresponding main gate line among the main gate lines may be disposed at the second distance Bk2.

The sub-gate lines of the gate lines GL1 to GLn may be insulated from the main data lines of the data lines DL1 to DLm while crossing the main data lines of the data lines DL1 to DLm. The sub-gate lines of the gate lines GL1 to GLn may be disposed on the same layer as the main data lines of the data lines DL1 to DLm.

That is, one main data line among the main gate lines is disposed to cross one sub-gate line among the sub-gate lines arranged at the first distance Bk1. In this case, the corresponding one main data line among the main data lines may be disposed at the first distance Bk1.

Each of the pixels PX1k to PX2z may be connected to a corresponding main gate line of the main gate lines and a main data line of the main data lines.

Figure 8:
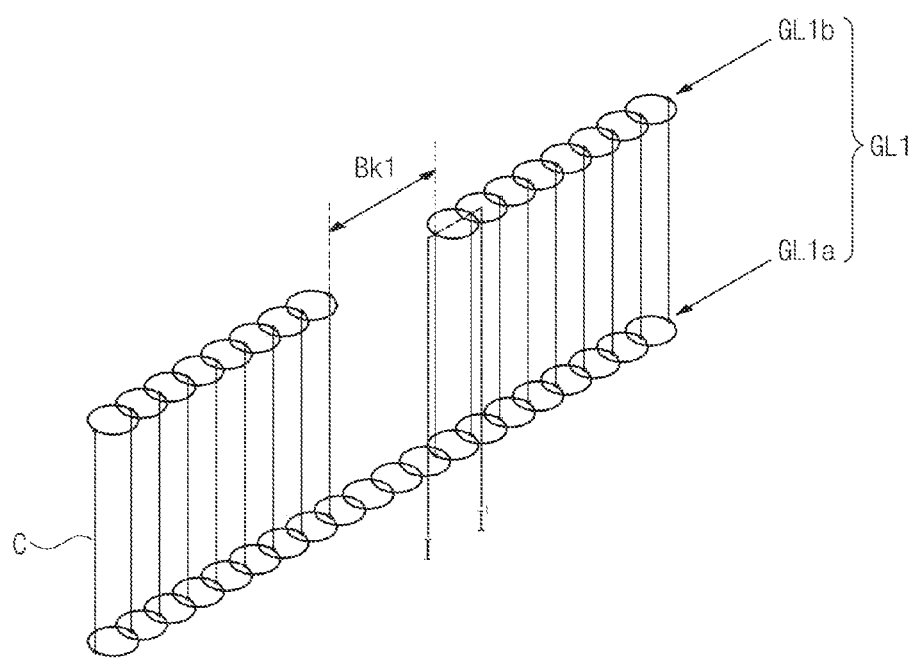
FIG. 8 is a perspective view showing first gate lines shown in FIG. 7.
Figure 9:
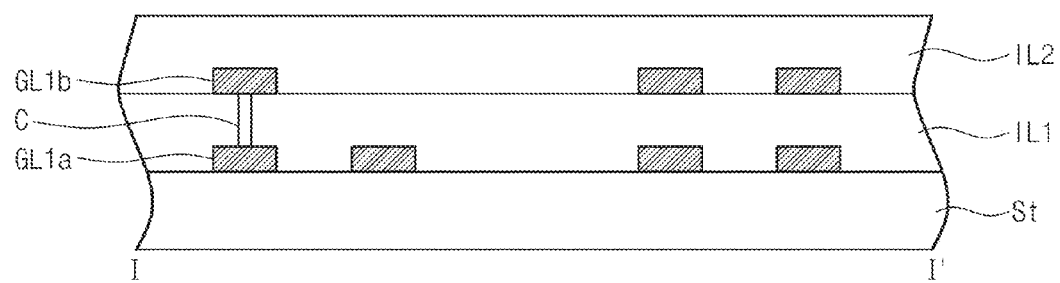
FIG. 9 is a cross-sectional view taken along a line I-I' shown in FIG. 8.

FIG. 8 is a perspective view showing a first gate lines GL1 shown in FIG. 7 and FIG. 9 is a cross-sectional view taken along a line I-I' shown in FIG. 8.

FIGS. 8 and 9 respectively show a perspective view and a cross-sectional view of the first gate line GL1 among the gate lines GL1 to GLn. At least one line of the gate lines GL1 to GLn and the data lines DL1 to DLm may have the structure shown in FIG. 8.

Referring to FIGS. 8 and 9, the display panel 100 includes a substrate St, the first main gate line GL1a, a first insulating layer ILL a first sub-gate line GL1b, and a second insulating layer IL2.

The substrate St may be disposed at a lowermost position of the display panel 100 (refer to FIG. 3). The first main gate line GL1a may be disposed on the substrate St. The first insulating layer IL1 covers the first main gate line GL1a and may be disposed on the substrate St. The first insulating layer IL1 protects the first main gate line GL1a and insulates the first main gate line GL1a from other lines.

The first sub-gate line GL1b may be insulated from the first main gate line GL1a and disposed on the first insulating layer IL1 as the plurality of segments spaced apart from each other by the first distance Bk1. The second insulating layer IL2 covers the first sub-gate line GL1b and may be disposed on the first insulating layer IL1.

As described above with reference to FIG. 5, the first gate line GL1 includes the ring patterns arranged in one direction and two ring patterns adjacent to each other may be connected to each other at least one position. That is, each of the first main gate line GL1a and the first sub-gate line GL1b may be disposed on the substrate St and may have the ring patterns. In particular, the first sub-gate line GL1b may be realized by the plurality of segments spaced apart from each other by the first distance Bk1.

The first main gate line GL1a and the first sub-gate line GL1b may be electrically connected to each other through at least one contact hole C formed through the first insulating layer IL1. As a result, although the disconnection occurs at a portion of the first gate line GL1, the first main gate line GL1a and the first sub-gate line GL1b connected to each other through the contact hole C may send and/or receive the gate signal to and/or from each other.

Although not shown in figures, the main data line of each of the data lines DL1 to DLm may be disposed on the second insulating layer IL2 crossing the corresponding sub-gate line. The sub-data line of each of the data lines DL1 to DLm may be disposed on the first insulating layer IL1 crossing the corresponding main gate line.

Figure 10:
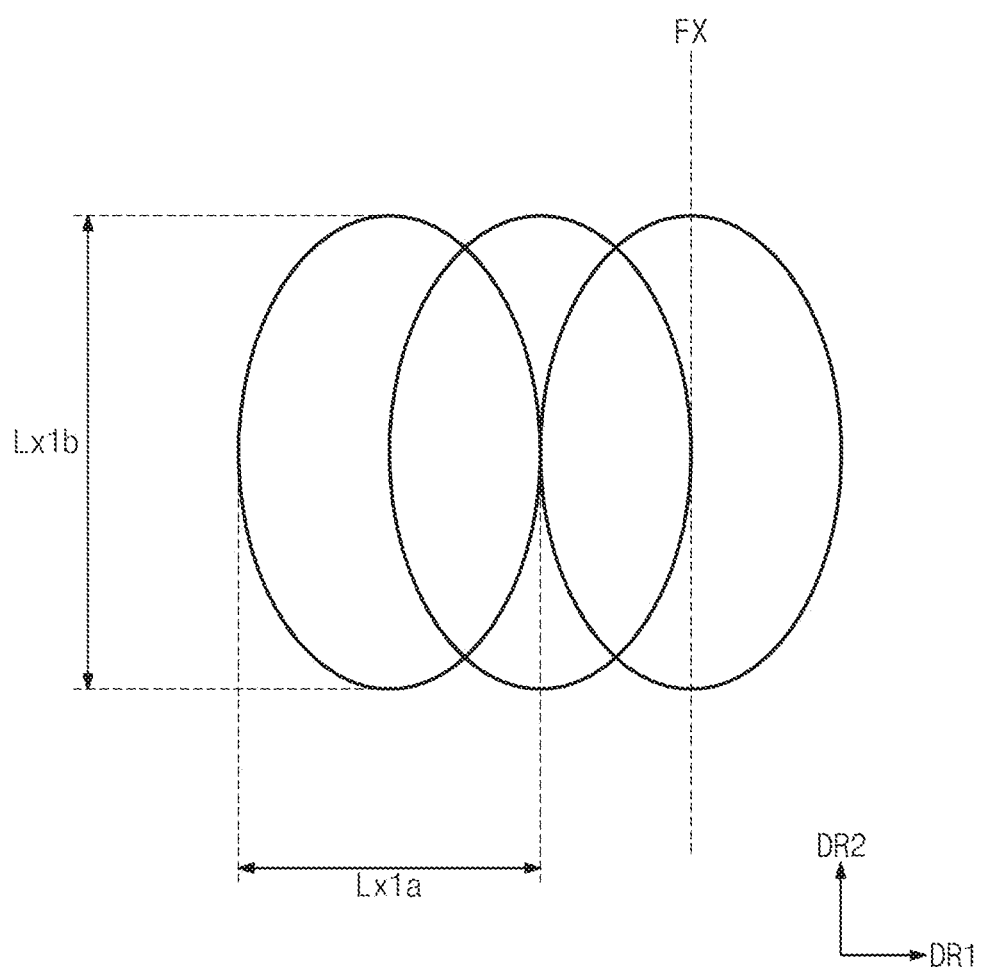
FIGS. 10 and 11 are views showing a structure of lines included in a display panel according to another exemplary embodiment of the present disclosure.
Figure 11:
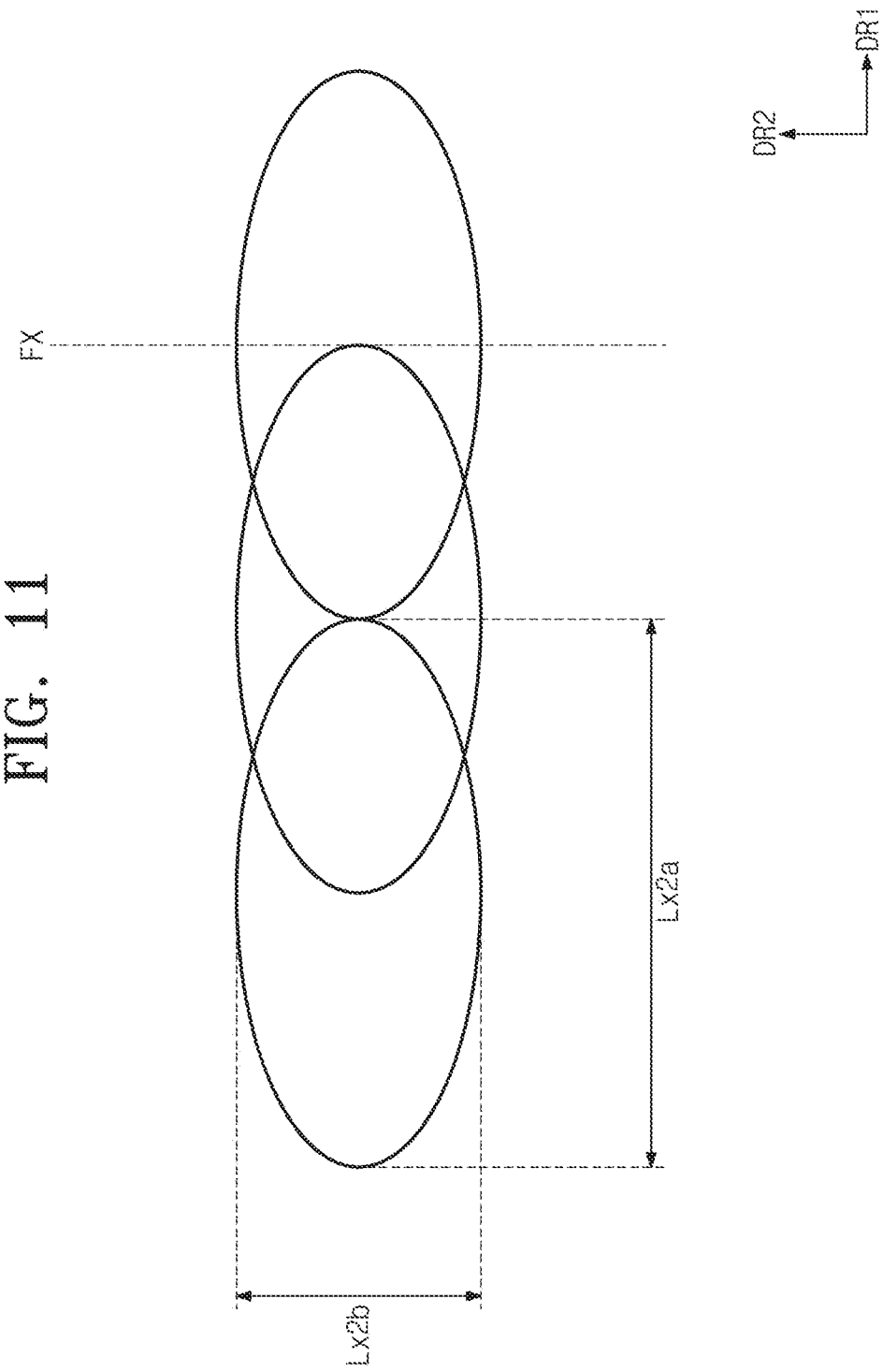

FIGS. 10 and 11 are views showing a structure of lines included in a display panel according to another exemplary embodiment.

Referring to FIGS. 10 and 11, at least one line of the gate lines GL1 to GLn and the data lines DL1 to DLm has the ring patterns.

As an example, each ring pattern shown in FIG. 10 may have an oval shape with a first diameter Lx1a in the first direction DR1 and a second diameter Lx1b in the second direction DR2 relative to the folding axis FX. In this case, the first diameter Lx1a may be shorter than the second diameter Lx1b.

As an example, each ring pattern shown in FIG. 11 may have an oval shape with a first diameter Lx2a in the first direction DR1 and a second diameter Lx2b in the second direction DR2 relative to the folding axis FX. In this case, the first diameter Lx2a may be longer than the second diameter Lx2b.

Figure 12:
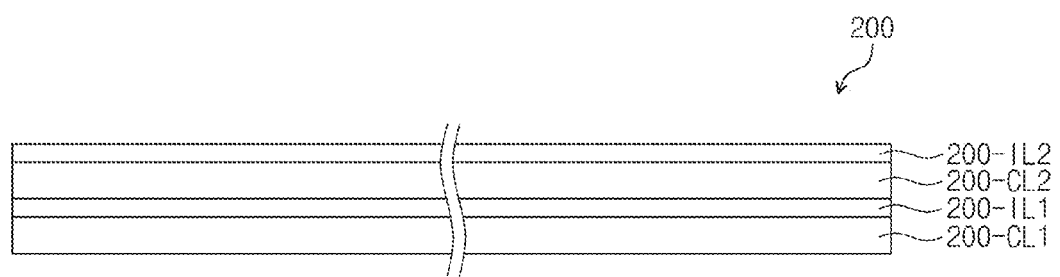
FIG. 12 is a cross-sectional view showing a touch panel according to an exemplary embodiment.
Figure 13:
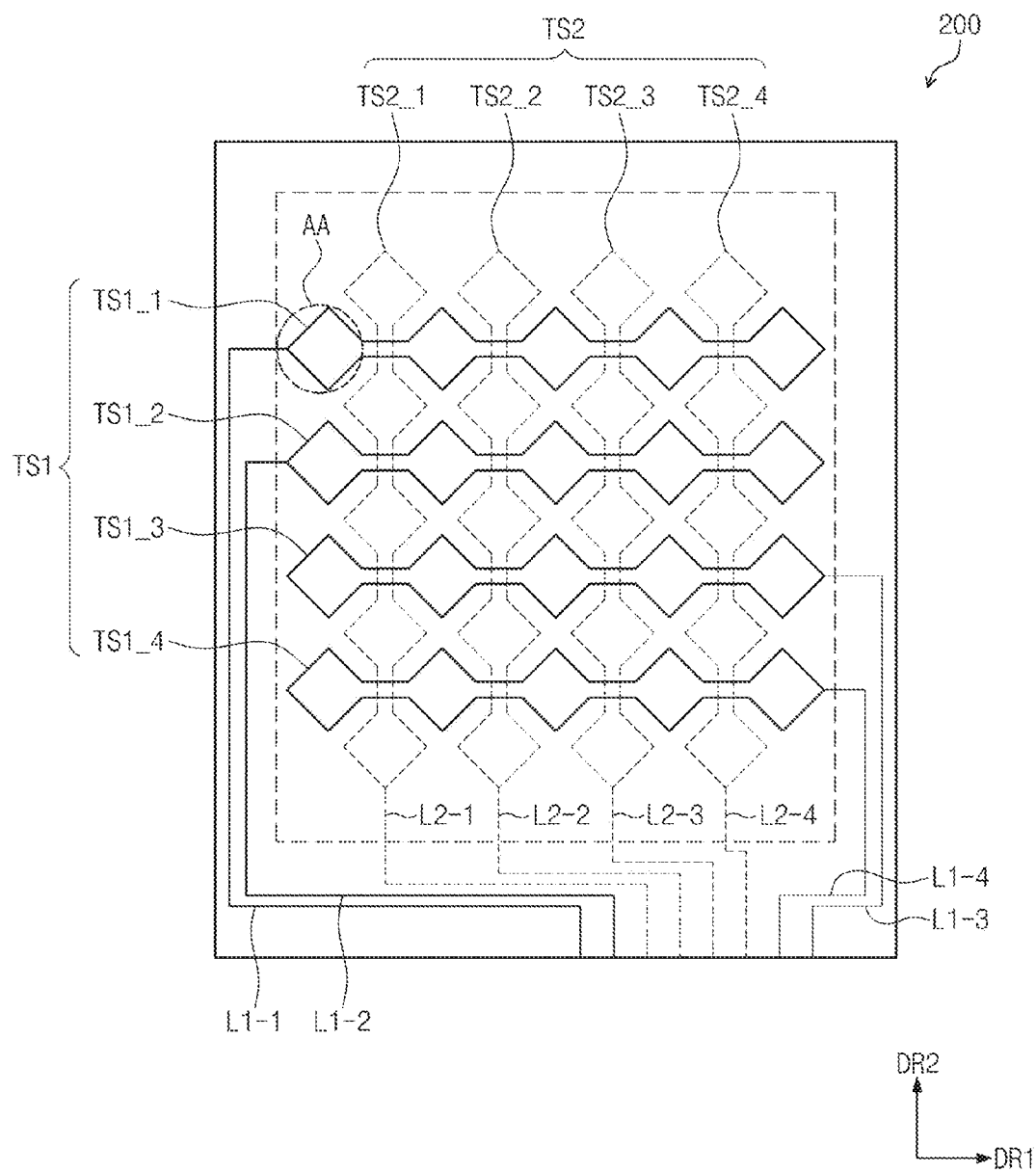
FIG. 13 is a plan view showing a touch panel according to an exemplary embodiment.
Figure 14:
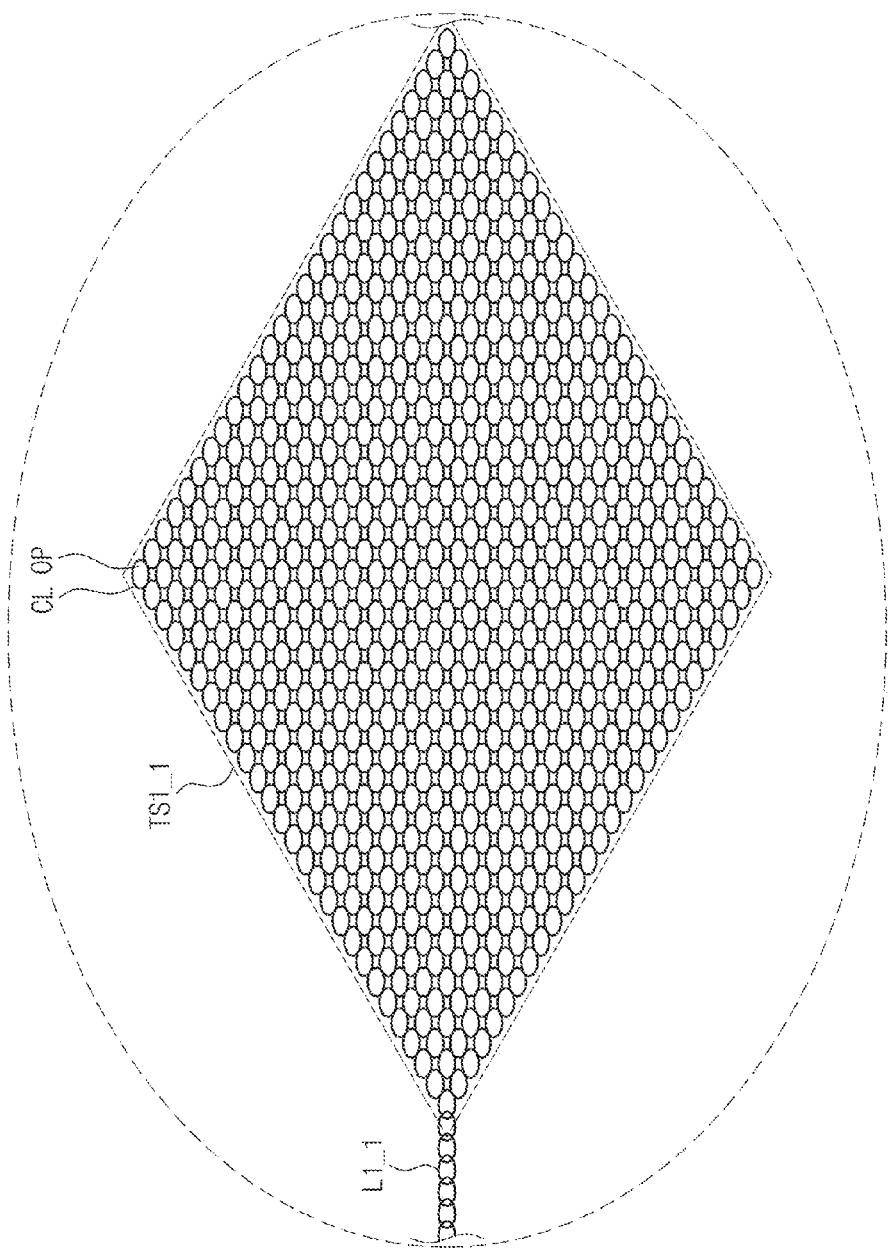
FIG. 14 is an enlarged plan view showing a portion "AA" shown in FIG. 13.

FIG. 12 is a cross-sectional view showing a touch panel 200 according to an exemplary embodiment, FIG. 13 is a plan view showing the touch panel 200 according to an exemplary embodiment of the present disclosure, and FIG. 14 is an enlarged plan view of a portion "AA" shown in FIG. 13.

Referring to FIG. 12, the touch panel 200 includes a base member 200-BS, a first conductive 200-CL1, a first insulating layer 200-IL1, a second conductive layer 200-CL2, and a second insulating layer 200-IL2. The first conductive layer 200-CL1, the first insulating layer 200-IL1, the second conductive layer 200-CL2, and the second insulating layer 200-IL2 may be sequentially stacked on the base member 200-BS.

In the present exemplary embodiment, the touch panel 200 may be, but is not limited to, an electrostatic capacitance type touch panel. The touch panel 200 should not be limited to a specific touch panel as long as the touch panel 200 includes two kinds of sensors crossing each other. For example, an electrostatic capacitance type touch panel obtains coordinate information using self-capacitance or a mutual capacitance. According to some embodiments, the touch panel 200 may be, for example, a resistive layer type touch panel, an electromagnetic induction type touch panel, or a sound wave type touch panel.

The first conductive layer 200-CL1 may include a transparent conductive oxide, e.g., indium tin oxide (ITO), indium zinc oxide (IZO), zinc oxide (ZnO), indium tin zinc oxide (ITZO), etc. The first conductive layer 200-CL1 may include a metal material, such as molybdenum, silver, titanium, copper, aluminum, or an alloy thereof. The first conductive layer 200-CL1 may include PEDOT, metal nanowire, or graphene. The first conductive layer 200-CL1 may include a first layer including one of the above-mentioned materials, a second layer including another one of the above-mentioned materials, and other layers.

The first conductive layer 200-CL1 includes a plurality of conductive patterns disposed on one surface of the base member 200-BS. The conductive patterns form touch sensors and signal connection lines described later. The touch sensors and the signal connection lines include a plurality of conductive lines. The conductive lines may be formed by patterning the first conductive layer 200-CL1 using a photolithography process.

The first insulating layer 200-IL1 protects the conductive patterns or insulates a portion of the conductive patterns from the other portion of the conductive patterns. The first insulating layer 200-IL1 may include an inorganic layer or an organic layer. The first insulating layer 200-IL1 may have a multi-layer structure and may include at least one inorganic layer and at least one organic layer.

The second conductive layer 200-CL2 may include a transparent conductive oxide. The second conductive layer 200-CL2 may have a single-layer structure or a multi-layer structure. The second conductive layer 200-CL2 may include a plurality of conductive patterns. The conductive patterns may include a connection electrode, which is described later.

The second insulating layer IL2 may protect the second conductive layer 200-CL2. The second insulating layer 200-IL2 may include an inorganic layer or an organic layer. The second insulating layer 200-IL2 may have a multi-layer structure and may include at least one inorganic layer and at least one organic layer.

The second insulating layer 200-IL2 may be omitted. Positions of the first and second conductive layers 200-CL1 and 200-CL2 may be changed with respect to each other.

The lines included in the touch panel 200 may have the ring pattern shape shown in FIG. 5. That is, the touch panel 200 includes the signal 1 connection line and the touch sensors, which have the ring patterns may be arranged in one direction and may be connected to each other at in least one position rather than a straight line or diamond shape.

Referring to FIGS. 12 and 13, the touch panel 200 includes first touch sensors TS1 and second touch sensors TS2. The first touch sensors TS1 extend in the first direction DR1 and are arranged in the second direction DR2. The second touch sensors TS2 may be insulated from the first touch sensors TS1 and may cross the first touch sensors TS1.

FIG. 12 shows four first touch sensors TS1_1 to TS1_4 and four second touch sensors TS2_1 to TS2_4. The first and second touch sensors TS1 and TS2 may be disposed to overlap with the display area DA (refer to FIG. 1).

Referring to FIG. 13, the touch panel 200 may further include signal connection lines. The signal connection lines include first signal connection lines L1 and second signal connection lines L2. The first signal connection lines L1 include first to fourth signal connection lines L1_1 to L1_4 respectively connected to ends of the first touch sensors TS1. The second signal connection lines L2 include first to fourth signal connection lines L2_1 to L2_4 respectively connected to ends of the second touch sensors TS2. The first and second signal connection lines L1 and L2 may be disposed to overlap with the non-display area NDA (refer to FIG. 1).

The base member 200-BS provides a base surface on which the first touch sensors TS1, the second touch sensors TS2, the first signal connection lines L1, and the second signal connection lines L2 may be disposed.

Each of the first and second touch sensors TS1 and TS2 may have substantially a diamond shape and includes conductive lines CL having the ring pattern. In more detail, the conductive lines CL included in each of the first and second touch sensors TS1 and TS2 may be connected to each other in at least one position and may include an opening OP.

According to exemplary embodiments, the first and second touch sensors TS1 and TS2 have the diamond shape, but the shape of the first and second touch sensors TS1 and TS2 should not be limited thereto. For instance, each of the first and second touch sensors TS1 and TS2 may have a circular shape or a quadrangular shape.

Each of the first and second signal connection lines L1 and L2 include the ring patterns shown in FIG. 5. As described above with reference to FIG. 5, each of the first and second signal connection lines L1 and L2 includes the ring patterns in which two ring patterns adjacent to each other may be connected to each other in at least one position.

As an example, referring to the first touch sensor TS_1 shown in FIG. 14, two adjacent ring patterns among the ring patterns included in the first signal connection line L1_1 may be connected to each other at two positions. In the case of the conductive lines CL included in the first touch sensor TS1_1, two ring patterns adjacent to each other may be connected to each other in at least one position. However, the shape of the ring patterns included in the conductive lines and the signal connection lines should not be limited thereto or thereby.

According to the above, the display panel and the touch panel include the lines having the ring pattern. Thus, the lines may be prevented from being disconnected when the display device is folded.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
   a substrate;
   gate lines disposed on the substrate and extending in a first direction;
   data lines insulated from the gate lines and extending in a second direction crossing the first direction; and
   pixels electrically connected to the gate lines and the data lines, at least one line of the gate lines and the data lines comprising a ring pattern,
   wherein:
   the ring pattern comprises rings;
   adjacent rings of the rings are electrically connected to each other in at least one position; and
   at least one line of the gate lines and the data lines comprises a main line and a sub-line disposed on a layer different from the main line, the sub-line being electrically connected to the main line.

2. The display device of claim 1, wherein:
   the rings comprise first, second, and third rings consecutively arranged, the first and second rings are electrically connected to each other at two positions; and
   the second and third rings are electrically connected to each other at two positions.

3. The display device of claim 2, wherein the first and third rings are electrically connected to each other at one position.

4. The display device of claim 2, wherein each of the first, second, and third rings has a circular shape.

5. The display device of claim 4, wherein each of the first, second, and third rings has an oval shape.

6. The display device of claim 1, further comprising:
   an insulating layer covering the main line disposed on the substrate,
   wherein the sub-line is disposed on the insulating layer.

7. The display device of claim 6, wherein the insulating layer comprises a plurality of contact holes formed therethrough to electrically connect the main line and the sub-line.

8. The display device of claim 1, wherein the sub-line comprises a plurality of division lines spaced apart from each other at every predetermined distance.

9. The display device of claim 8, wherein:
   when the sub-line comprises a sub-gate line, a main data line is disposed in a distance between adjacent segments of the sub-gate line; and
   when the sub-line comprises a sub-data line, a main gate line is disposed in a distance between adjacent segments of the sub-data line.

10. The display device of claim 1, further comprising:
    an insulating layer covering the sub-line disposed on the substrate,
    wherein the main line is disposed on the insulating layer.

11. The display device of claim 10, wherein the insulating layer comprises contact holes formed therethrough to electrically connect the main line and the sub-line.

12. The display device of claim 1, further comprising:
    an insulating layer disposed on the gate lines and the data lines; and
    a touch panel disposed on the insulating layer and comprising a first touch sensor and a second touch sensor crossing the first touch sensor.

13. The display device of claim 12, wherein at least one touch sensor of the first and second touch sensors comprises conductive lines, each of the conductive lines having a ring pattern shape.

14. The display device of claim 13, wherein two conductive lines disposed adjacent to each other are electrically connected in at least one position.

15. The display device of claim 13, wherein:
    the touch panel further comprises a signal line electrically connected to at least one conductive line; and
    the signal line comprises the ring pattern shape.

16. The display device of claim 12, wherein the display device is configured to be folded in a folding area.

17. The display device of claim 12, further comprising:
    a window member disposed on the touch panel.

18. A foldable display device, comprising:
    a folding area;
    a non-folding area;
    a display panel comprising a first signal line disposed in the folding area; and
    a touch panel comprising a second signal line disposed in the folding area,
    wherein:
    at least one signal line of the first signal line and the second signal line comprises ring patterns arranged in a direction in which the at least one signal line extends; and
    each ring pattern of the ring patterns comprises an outer conductive ring surrounding an interior void, and
    wherein two adjacent ring patterns among the ring patterns comprise:
    interior voids that overlap in a direction normal to the direction in which the at least one signal line extends; and
    outer conductive rings electrically connected to each other via at least one intersection between the outer conductive rings.

19. The foldable display device of claim 18, wherein the outer conductive rings of the two adjacent ring patterns intersect with one another via only two intersections.

* * * * *